United States Patent [19]

Azegami et al.

[11] Patent Number: 4,460,653

[45] Date of Patent: Jul. 17, 1984

[54] MAGNETIC RECORDING MEDIUM

[75] Inventors: Hitoshi Azegami, Tobu; Hiroshi Kawahara, Saku; Fujio Shibata, Komoro, all of Japan

[73] Assignee: TDK Corporation, Tokyo, Japan

[21] Appl. No.: 544,804

[22] Filed: Oct. 24, 1983

Related U.S. Application Data

[63] Continuation of Ser. No. 441,281, Nov. 12, 1982, abandoned.

[30] Foreign Application Priority Data

Nov. 16, 1981 [JP] Japan ................................ 56-182253
Nov. 16, 1981 [JP] Japan ................................ 56-182254

[51] Int. Cl.$^3$ .............................................. H01F 10/02
[52] U.S. Cl. ............................ 428/425.9; 252/62.54; 428/522; 428/694; 428/900
[58] Field of Search ................. 252/62.54; 428/425.9, 428/694, 900, 522

[56] References Cited

U.S. PATENT DOCUMENTS 4,234,438 11/1980 Horigome et al. ............... 252/62.54

Primary Examiner—Bernard D. Pianalto
Attorney, Agent, or Firm—Wyatt, Gerber, Shoup, Scobie & Badie

[57] ABSTRACT

A magnetic recording medium, comprising a magnetic layer and a non-magnetic substrate therefor, which magnetic layer is formed by dispersing magnetic powder in a vehicle formed of a copolymer containing vinyl chloride, another monomer copolymerizable with said vinyl chloride, a vinyl ester of an alkanoic acid and a saponification product thereof and having an OH/CH absorption ratio of 0.2 to 0.7 in the infrared absorption spectrum, and a rubbery binder.

10 Claims, 2 Drawing Figures

MAGNETIC RECORDING MEDIUM

This application is a continuation of application Ser. No. 06/441281, filed Nov. 12, 1982, now abandoned.

BACKGROUND OF THE INVENTION

1. Field of the Invention

This invention relates to a magnetic recording medium, and more particularly to a magnetic recording medium which enjoys improved surface flatness property, permits easy preparation by the calendering process, exhibits improved high frequency response, and excels in both stability for storage and running performance under conditions of high temperature and high humidity.

2. Description of Prior Arts

Heretofore, the vinyl chloride-vinyl acetate-vinyl alcohol copolymer has been widely used as a resin for the binder in the magnetic tape.

The vinyl chloride-vinyl acetate-vinyl alcohol copolymer is represented by the product of Union Carbide Corporation of the U.S. marketed under the trademark designation of "VAGH." Japanese makers of this copolymer are producing the copolymer in a unified composition of 91% of vinyl chloride, 3% of vinyl acetate and 6% of vinyl alcohol. This copolymer features relatively low cost, ready solubility in solvents, high compatibility with other resins and ability to mix intimately with the magnetic powder and improve the dispersibility of the magnetic powder owing to the hydroxyl group contained in the molecular unit. Particularly the excellent dispersibility of the copolymer enables the magnetic tape to manifest excellent magnetic properties such as high degree of orientation and high maximum residual magnetic flux density. In recent years, the technique for size reduction of magnetic powder has advanced so much that even a resin with the outstanding properties of the copolymer in question can no longer satisfy the dispersibility expected of the very fine magnetic powder. A study conducted with a view to increasing the content of hydroxyl groups in copolymers of the kind in question has ascertained that incorporation of OH to a level at which the absorption ratio of OH/CH in the infrared absorption spectrum exceeds 0.7 brings about sufficient dispersibility in the copolymers. A copolymer which has its content of hydroxyl groups increased to that level, however, has a glass transition point as high as 70° C. The copolymer, therefore, does not permit easy surface treatment and suffers particularly from poor fabricability by the calendering process. Consequently, a layer of magnetic resin using this copolymer does not easily acquire improved surface property after the treatment by the calendering process. A binder made of the vinyl chloride-vinyl acetate-vinyl alcohol copolymer of improved dispersibility, therefore, is not always satisfactory from the standpoint of dispersibility of magnetic powder in the magnetic layer and mirror smoothness of the surface of magnetic layer. More specifically, surface coats prepared from vinyl chloride-vinyl acetate-vinyl alcohol copolymers often manifest poor surface property of the magnetic layer after the treatment by the calendering process, although they may well be regarded as satisfactory in terms of the dispersibility of magnetic powder.

To deal with these disadvantages, the inventors formerly found that addition of a resin component having a glass transition point below 65° C. to the aforementioned vinyl chloride-vinyl acetate-vinyl alcohol as a binder would improve the surface property of the applied magnetic layer without impairing the dispersibility of the magnetic powder and also improve the gloss of the magnetic layer after the treatment by the calendering process (Japanese patent application No. 94016/1981, etc.). Unfortunately, it has been found that the produced magnetic layer suffers from poor preservability and travelling property under conditions of high temperature and high humidity because of the fall of glass transition point.

An object of this invention, therefore, is to provide a magnetic recording medium which is free from the disadvantages mentioned above.

Another object of this invention is to provide a magnetic recording medium which excels in high frequency response and enjoys high stability for storage and running performance under conditions of high temperature and high humidity.

SUMMARY OF THE INVENTION

The objects described above are attained in a magnetic recording medium comprising a magnetic layer and a non-magnetic substrate therefor, which magnetic layer is formed by dispersing magnetic powder in a vehicle formed of a copolymer containing vinyl chloride, another monomer copolymerizable with vinyl chloride, a vinyl ester of an alkanoic acid and the saponification product thereof having an OH/CH absorption ratio of 0.2 to 0.7 in the infrared absorption spectrum thereof, and a rubbery binder.

The aforementioned objects of the present invention are further attained by a magnetic recording medium comprising a magnetic layer and a non-magnetic substrate therefor, which magnetic layer is formed by dispersing magnetic powder in a vehicle formed of a copolymer containing vinyl chloride, another monomer copolymerizable with the aforementioned vinyl chloride, a vinyl ester of an alkanoic acid and the saponification product thereof having an OH/CH absorption ratio of 0.2 to 0.7 in the infrared absorption spectrum, a rubbery binder, and polyisocyanate.

In accordance with the present invention, the vehicle having magnetic powder dispersed therein facilitates the treatment of the magnetic recording medium by the calendering process, improves the gloss of the magnetic recording medium after the treatment by the calendering process, and stabilizes the stability for storage and running performance of the produced magnetic recording medium under conditions of high temperature and high humidity. These improved physical properties of the magnetic layer are ascribable to the fact that the rise of glass transition point is effected by reducing the content of saponification product as much as possible, the fact that the loss of the dispersibility of magnetic powder due to the decrease of the content of saponification product is compensated for by incorporation of the monomer copolymerizable with vinyl chloride, and the fact that polyisocyanate is used as a curing agent in combination with the rubbery binder.

PREFERRED EMBODIMENT OF THE INVENTION

Figure 1:
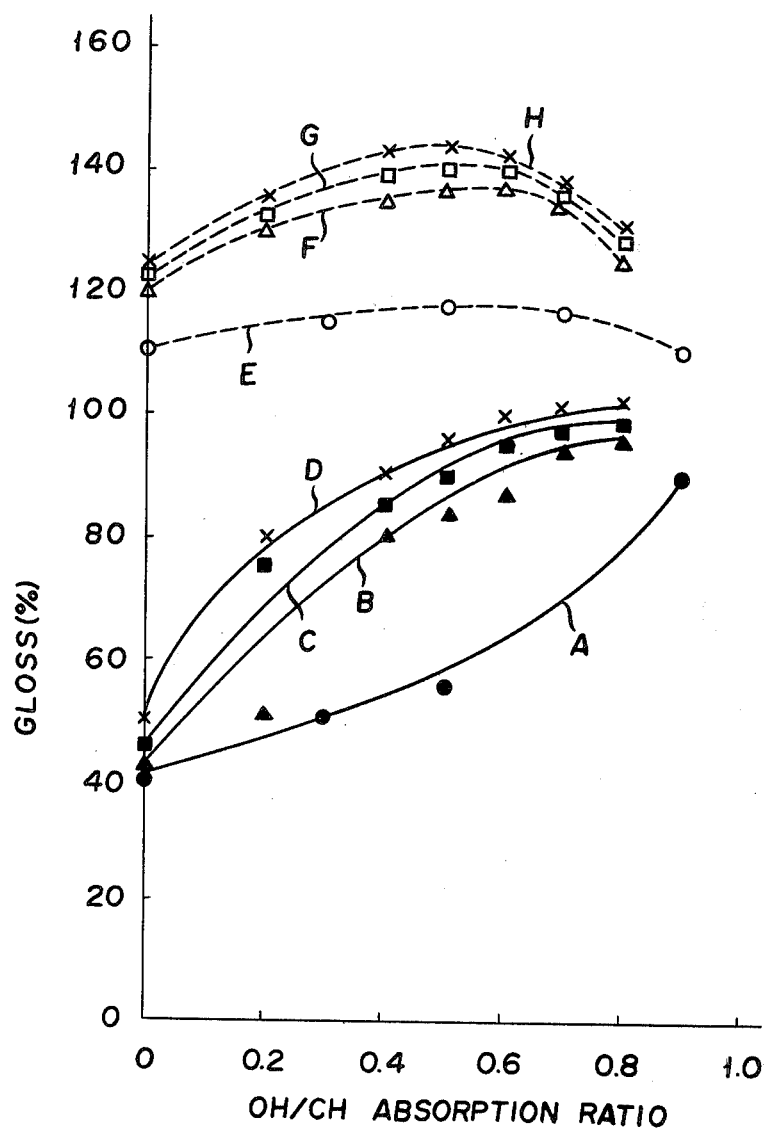
FIGS. 1–2 are graphs illustrating the properties of the magnetic recording medium produced by the present invention in comparison with those of the conventional magnetic recording medium.

The copolymer which is used in the vehicle for dispersion of the magnetic powder in accordance with the present invention contains vinyl chloride, another monomer copolymerizable with the vinyl chloride, a vinyl ester of an alkanoic acid and the saponification product of thereof having an OH/CH absorption ratio of 0.2 to 0.7 in the infrared absorption spectrum. This copolymer may be produced by any of several methods known in the art. For example, it may be obtained by saponifying a copolymer containing vinyl chloride-vinyl alkanoate- and another copolymerizable monomer to form a saponified product.

The vinyl ester of an alkanoic acid and the saponification product thereof which are used in the copolymer mentioned above are vinyl alcohol esters of carboxylic acids of alkanes. Examples are vinyl acetate, vinyl propionate, vinyl butyrate, vinyl valerate, and saponification products thereof. Vinyl acetate, vinyl propionate and the saponification products thereof are preferred. The most preferred are vinyl acetate and the saponification product thereof. Examples of monomers copolymerizable with vinyl chloride are maleic acid, fumaric acid, acrylic acid, methacrylic acid, alkyl acrylates such as methyl acrylate, ethyl acrylate, isopropyl acrylate and n-butyl acrylate, alkyl methacrylates such as methyl methacrylate and ethyl methacrylate, acrylonitrile, methacrylonitrile, vinyl bromide, vinylidene chloride, ethylene and propylene. During the aforementioned saponification (typically, the saponification of vinyl chloride-vinyl alkanoate-comonomer copolymer), the reaction must be controlled in order that the OH/CH absorption ratio is from 0.2 to 0.7, in the infrared absorption spectrum. This control is important because the reaction which is conducted for the purpose of lowering the glass transition point should not have the effect of impairing the dispersibility of the magnetic powder. In the infrared absorption referred to herein, the OH absorption occurs at 3450 cm$^{-1}$ and the CH absorption at 2930 cm$^{-1}$ and the OH/CH absorption ratio is the ratio of their respective intensities of absorption.

It has been ascertained that the aforementioned copolymer is operable in the invention so long as it is composed of 50 to 90% by weight of vinyl chloride, 40 to 5% by weight of a vinyl ester of an alkanoic acid, 5 to 1.5% by weight of another monomer copolymerizable with the aforementioned vinyl chloride, and the balance to make up 100% by weight of the saponification product of the aforementioned vinyl ester of alkanoic acid.

Examples of the rubbery binder advantageously usable in the preparation of the vehicle for dispersion of magnetic powder in accordance with the present invention are acrylonitidle-butadiene rubber, nitrile rubber, styrene-butadiene rubber, ethylene-propylene rubber, butyl rubber, polyurethane, polyesters and varying species of natural rubber.

In one embodiment of the present invention, there is provided a magnetic recording medium which has magnetic powder deposited firmly on a non-magnetic substrate in a binder comprising the aforementioned copolymer and an acrylonitrile-butadiene rubber. In another embodiment of the present invention, there is provided a magnetic recording medium which has magnetic powder deposited firmly on a non-magnetic substrate in a binder comprising the aforementioned copolymer and a polyurethane resin. In still another embodiment of the present invention, there is provided a magnetic recording medium which has magnetic powder deposited firmly on a non-magnetic substrate in a binder comprising the aforementioned copolymer, a polyurethane resin, and a polyisocyanate. In a fourth embodiment of the present invention, there is provided a magnetic recording medium which has magnetic powder deposited firmly on a non-magnetic substrate in a binder comprising the aforementioned copolymer, polyisocyanate, a polyurethane resin and/or a polyester resin. The polyisocyanate reacts with the OH group and the active hydrogen group in the aforementioned copolymer and also reacts with the active hydrogen groups in the polyurethane and polyester to form crosslinks and, consequently, rigidifies and reinforces the magnetic film.

Typical polyurethanes which are advantageously usable in the present invention are "Nippolan 2304", "Nippolan 2301", Nippolan 3022", "Nippolan 5032", "Nippolan 5033" and "Paraprene 22S" (all trademark designations) made by Nippon Polyurethane Co., Ltd., "Esten 5702", "Esten 5703", "Esten 5711", "Esten 5712" and "Esten 5717" (all trademark designations) made by Goodrich Chemical Company of the U.S., "Cripson 4216", "Cripson 4407" and "Cripson 7209" (all trademark designations) made by Dainippon Ink Chemical Co., Ltd., "ES-254", "ES-255", "EA-256", "Praccel Series 205, 208, 212, 230 and 240" and "Praccel Series 303, 305, 308, 320 and 330" (all trademark designations) made by Daicel Chemical Co., Ltd., "T-1040" and "E-550" made by Takeda Chemical Industries, Ltd. and "Pandex Series T-5000, T-5009, T-5010, T-5102, T-5205 and 5260TH" (all trademark designations) made by Dainippon Ink Chemical Co., Ltd. The amount of such polyurethane to be used is 80 to 10%, preferably 60 to 20%, by weight based on the total resin content in the binder. Typical polyester resins usable as an equivalent to the polyurethane include "Desmophen 2200", "Desmophen 1700", "Desmophen 1100", "Desmophen 800" and "Desmophen 650" (all trademark designations) made by Bayer AG, "Nippolan 1004" and "Nippolan 4032" (trademark designations) made by Nippon Polyurethane Co., Ltd. and "Bylon 200", "Bylon 300" and "Bylon 500" (all trademark designations) made by Toyo Spinning Co., Ltd. The amount of such polyester to be used may be substantially equal to that of the polyurethane mentioned above.

Mixtures of polyester and the polyurethane resins may also be employed. The combined amount of these components in the binder may be practically the same as that of the polyurethane used independently.

The rubbery binder for this invention is typically employed in an amount of 10 to 60 parts by weight based on 100 parts by weight of the copolymer. Similarly, the polyisocyanate is used in an amount of 5 to 30% by weight, preferably 10 to 25% by weight, based on the total resin content. Typical polyisocyanates usable advantageously for this purpose include "Desmodur L" made by Bayer AG, "Coronate L", "Coronate HL" and "Coronate 2036" made by Nippon Polyurethane Co., Ltd., and "Takenate 2036" made by Takeda Chemical Industries, Ltd. (all trademark designations).

Examples of magnetic powder usable advantageously for the production of the magnetic recording medium in this invention include, $\gamma$-$Fe_2O_3$, Fe-Co-Ni alloy, $Fe_3O_4$, $CrO_2$, and $\gamma$-$Fe_2O_3$ doped with cobalt. The needle-shaped $\gamma$-$Fe_2O_3$ doped with cobalt is preferred. The particles of such a magnetic powder desirably measure up to 0.4 $\mu$m in major axis and 0.04 $\mu$m in minor axis. The weight ratio magnetic powder to total of copolymer and binder (calculated as solids) to be used is usually 3/1 to 5.5/1.

The aforementioned vehicle is dissolved in an organic solvent such as, for example, a mixture of methyl ethyl ketone, methyl isobutyl ketone and toluene in a weight ratio 4:3:3 in a solid content excluding pigment of about 10%. In the resultant solution of the vehicle, the magnetic powder is uniformly dispersed to produce a magnetic paint. This magnetic paint is spread in a layer to a dry film thickness of 2 to 15 $\mu$m, preferably 4 to 6 $\mu$m, on the surface of a substrate of polyethylene terephthalate film and then dried.

Now, the present invention will be described below with reference to working examples and corresponding controls.

Control 1

| | |
|---|---|
| Vinyl chloride-vinyl acetate copolymer* (OH/CH absorption ratios 0, 0.3, 0.5, 0.7 and 0.9) | 24 g to 36 g |
| Polyurethane (Nippolan 5033) | 4 g to 16 g |
| Additive (myristic acid and silicone oil) | 0 g to 20 g |
| Dispersant (Sorbitan esters) | 3.6 g to 6 g |
| Magnetic powder ($\gamma$-$Fe_2O_3$) | 120 g to 200 g |

Control 2

| | |
|---|---|
| Vinyl chloride-vinyl propionate copolymer* (OH/CH absorption ratios 0, 0.2, 0.4, 0.6 and 0.8) | 16 g to 36 g |
| Acrylonitrile-butadiene rubber (Hiker 1312) | 4 g to 24 g |
| Additive (myristic acid and silicone oil) | 0 g to 20 g |
| Abrasive (fine powdered alumina) | 1 g to 5 g |
| Magnetic powder ($\gamma$-$Fe_2O_3$) | 120 g to 200 g |

Control 3

| | |
|---|---|
| Vinyl chloride-vinyl acetate copolymer* (OH/CH absorption ratios 0.3, 0.5, 0.7, 0.8 and 0.9) | 8 g to 18 g |
| Vinyl chloride-vinyl acetate copolymer** (among of monomer (maleic acid) 0.5, 1.0, 1.5, 2.0, 2.5 and 3.0%) | 8 g to 18 g |
| Polyurethane (Nippolan 2304) | 4 g to 24 g |
| Additive (myristic acid and silicone oil) | 0 g to 40 g |
| Magnetic powder ($\gamma$-$Fe_2O_3$) | 120 g to 200 g |
| Abrasive (fine powdered alumina). | 0 g to 10 g |

*Terpolymer including a saponification product represented by the absorption ratio shown in the parentheses.
**Terpolymer including the amount of maleic acid indicated in the parentheses.

Example 1

| | |
|---|---|
| Vinyl chloride-vinyl acetate copolymer*** (OH/CH absorption ratios 0, 0.2, 0.4 0.5, 0.6, 0.7 and 0.8) (amount of monomer (maleic acid) 0, 0.5, 1.0, 1.5, 2.0, 2.5 and 3.0%) | 16 g to 36 g |
| Polyurethane (Nippolan 5033) | 4 g to 24 g |
| Additive (myristic acid and silicone oil) | 0 g to 20 g |
| Dispersant (Sorbitan esters) | 3.6 g to 6 g |
| Abrasive (fine powdered alumina) | 0 g to 20 g |
| Magnetic powder ($\gamma$-$Fe_2O_3$) | 120 g to 200 g |

Example 2

Identical with the composition of Example 1, except that the magnetic powder was changed to $\gamma$-$Fe_2O_3$ doped with Co.

Example 3

| | |
|---|---|
| Vinyl chloride-vinyl propionate copolymer*** (OH/CH absorption ratios 0, 0.2, 0.4, 0.5, 0.6, 0.7, and 0.8) (amount of monomer (fumaric acid) 0, 0.5, 1.0, 1.5, 2.0, 2.5, and 3.0%) | 16 g to 36 g |
| Acrylonitrile-butadiene rubber (Nippon 1432) | 4 g to 24 g |
| Additive (stearic acid and silicone oil) | 0 g to 40 g |
| Abrasive (chromia) | 0 g to 20 g |
| Magnetic powder ($\gamma$-$Fe_2O_3$) | 120 g to 200 g |

Example 4

| | |
|---|---|
| Vinyl chloride-vinyl propionate copolymer*** (OH/CH absorption ratios 0, 0.2, 0.4, 0.5, 0.6, 0.7 and 0.8) (amount of monomer (maleic acid) 0, 0.5, 1.0, 1.5, 2.0, 2.5, and 3.0%) | 16 g to 36 g |
| Polyurethane (Nippolan 2304) | 4 g to 24 g |
| Additive (myristic acid and silicone oil) | 0 g to 40 g |
| Abrasive (fine powdered alumina) | 0 g to 20 g |
| Magnetic powder ($\gamma$-$Fe_2O_3$) | 120 g to 200 g |

Example 5

Identical with the composition of Example 4, except that the magnetic powder was changed to $\gamma$-$Fe_2O_3$ doped with Co.

*** Four-element copolymer including the saponification product indicated by the absorption ratio shown in the parentheses and the amount of monomer shown in the parentheses.

Control 4

| | |
|---|---|
| Vinyl chloride-vinyl acetate copolymer* (OH/CH absorption ratios 0, 0.3, 0.5, 0.7, and 0.9) | 24 g to 36 g |
| Polyurethane (#5033) | 4 g to 16 g |
| Dispersant (sorbitan esters) | 0 g to 10 g |
| Lubricant (myristic acid and silicone oil) | 1 g to 10 g |
| Magnetic power ($\gamma$-$Fe_2O_3$ doped with Co) | 120 g to 200 g |
| Polyisocyanate (Coronate L) | 0 g to 20 g |

Control 5

| | |
|---|---|
| Vinyl chloride-vinyl propionate copolymer* (OH/CH absorption ratios 0, 0.2, 0.4, 0.6 and 0.8) | 12 g to 28 g |
| Polyurethane (#2304) | 12 g to 28 g |
| Polyisocyanate (Coronate 2036) | 4 g to 20 g |
| Dispersant (phosphoric ester) | 0 g to 7 g |
| Lubricant (palmitic acid and silicone oil) | 1 g to 5 g |
| Abrasive (SiC) | 1 g to 5 g |
| Magnetic powder ($\gamma$-$Fe_2O_3$) | 120 g to 200 g |

Control 6

| | |
|---|---|
| Vinyl chloride-vinyl acetate copolymer** (amount of monomer (maleic acid) 0, 0.5, 1.0, 1.5, 2.0, 2.5 and 3%) | 12 g to 28 g |
| Polyester (#4032) | 12 g to 28 g |
| Dispersant (fatty acid esters) | 0 g to 10 g |
| Lubricant (stearic acid and silicone oil) | 1 g to 20 g |
| Abrasive (SiC) | 1 g to 10 g |
| Polyisocyanate (Coronate L) | 4 g to 20 g |
| Magnetic powder ($\gamma$-$Fe_2O_3$) | 120 g to 200 g |

Control 7

| | |
|---|---|
| Vinyl chloride-vinyl acetate copolymer* (OH/CH absorption ratio 0.3, 0.5, 0.7, 0.8 and 0.9) | 6 g to 14 g |
| Vinyl chloride-vinyl acetate copolymer** (amount of monomer (methacrylic acid) 0, 0.5, 1.0, 1.5, 2.0, 2.5 and 3%) | 6 g to 14 g |
| Polyurethane (#5032) | 12 g to 28 g |
| Dispersant (sorbitan esters) | 0 g to 10 g |
| Lubricant (myristic acid and silicone oil) | 1 g to 20 g |
| Polyisocyanate (Coronate L) | 4 g to 20 g |
| Magnetic Powder (Co-$\gamma$-$Fe_2O_3$) | 120 g to 200 g |

Example 6

| | |
|---|---|
| Vinyl chloride-vinyl acetate copolymer*** (OH/CH absorption ratios 0, 0.2, 0.4, 0.5, 0.6, 0.7, and 0, 0.5, 1.0, 1.5, 2.0, 2.5 and 3.0%) | 12 g to 28 g |
| Dispersant (sorbitan esters) | 0 g to 10 g |
| Lubricant (myristic acid and silicone oil) | 1 g to 10 g |
| Abrasive (fine powdered alumina) | 0 g to 20 g |
| Polyisocyanate (Coronate L) | 4 g to 20 g |
| Magnetic powder ($\gamma$-$Fe_2O_3$) | 120 g to 200 g |

Example 7

Identical with the composition of Example 1, except that the magnetic powder was changed to $\gamma$-$Fe_2O_3$ doped with Co.

Example 8

| | |
|---|---|
| Vinyl chloride-vinyl acetate copolymer*** (OH/CH absorption ratios 0, 0.2, 0.4, 0.5, 0.6, 0.7, and 0.8) (amount of monomer (maleic acid) 0, 0.5, 1.0, 1.5, 2.0, 2.5 and 3.0%) | 12 g to 28 g |
| Polyester (Desmophen 1700) | 12 g to 28 g |
| Dispersant (sorbitan esters) | 1 g to 20 g |
| Abrasive (fine powdered alumina) | 0 g to 20 g |
| Polyisocyanate (Coronate L) | 4 g to 20 g |
| Magnetic powder ($\gamma$-$Fe_2O_3$) | 120 g to 200 g |

Example 9

Identical with the composition of Example 3, except that the magnetic powder was changed to $\gamma$-$Fe_2O_3$ doped with Co.

Example 10

| | |
|---|---|
| Vinyl chloride-vinyl acetate copolymer*** (OH/CH absorption ratios 0, 0.2, 0.4, 0.5, 0.6, 0.7, and 0.8) (among of monomer (Methacrylic acid) 0, 0.5, 1.0, 1.5, 2.0, 2.5, and 3.0%) | |
| Polyester (#4032) | 6 g to 14 g |
| Polyurethane (#5033) | 6 g to 14 g |
| Dispersant (sorbitan esters) | 1 g to 20 g |
| Lubricant (myristic acid and silicone oil) | 1 g to 20 g |
| Abrasive (SiC) | 0 g to 10 g |
| Polyisocyanate (Colonate L) | 4 g to 20 g |
| Magnetic powder ($\gamma$-$Fe_2O_3$) | 120 g to 200 g |

Example 11

Identical with the composition of Example 5, except that the magnetic powder was changed to $\gamma$-$Fe_2O_3$ doped with Co.

Example 12

| | |
|---|---|
| Vinyl chloride-vinyl propionate copolymer*** (OH/CH absorption ratios 0, 0.3, 0.5, 0.6, 0.7 and 0.8) (amount of monomer (fumaric acid) 0, 0.5, 1.0, 1.5, 2.0, 2.5 and 3.0%) | 12 g to 28 g |
| Polyurethane (Takeda T-550) | 12 g to 28 g |
| Dispersant (sorbitan esters) | 0 g to 10 g |
| Lubricant (myristic acid and silicone oil) | 0 g to 10 g |
| Abrasive (fine powdered alumina) | 0 g to 15 g |
| Polyisocyanate (Coronate L) | 0 g to 20 g |
| Magnetic powder ($\gamma$-$Fe_2O_3$) | 120 g to 200 g |

*Terpolymer including the product of saponification indicated by the absorption ratio shown in the parentheses.
**Terpolymer including the amount of maleic acid shown in the parentheses.
***Four-element copolymer including the product of saponification indicated by the absorption ratio shown in the parentheses and the amount of monomer shown in the parentheses.

The preparation of the copolymer to be used in the present invention can be started from the vinyl chloride-vinyl acetate copolymer of varying proportions of components. The copolymers of Example 1, for instance, may be prepared by subjecting vinyl chloride-vinyl acetate-comonomer copolymers having vinyl chloride:vinyl acetate ratios of 6:4, 8:2 and 85:15 (by weight) to varying degrees of saponification and to copolymerization with given monomers.

The magnetic paints of the compositions of Control 1 and Example 1 were each applied in a layer thickness of 5 μm on the surface of polyethylene terephthalate film (15 μm in thickness) to produce magnetic tapes. In such case, weight ratio of magnetic powder/binder was 4:1, that of the copolymer/rubber binder was 6/4, myristic acid content was 1 phr, silicone oil content was 1 phr, sorbitan ester content was 3 phr, and mixed solvent of methyl ethyl ketone, methyl isobutyl ketone and toluene in a weight ratio of 4:3:3 in an amount of 400 phr to the total resin and binder. The surface flatness property of the magnetic tapes immediately after application of the magnetic paints and the surface flatness property of the magnetic tapes after the treatment by the calendering process were as shown in FIG. 1. In the graphs, lines based on black dots represent degrees of gloss of the magnetic tape immediately after the application of magnetic paints and dotted lines based on white dots those of gloss of the magnetic tapes after the treatment by the calendering process. The curves A and E represent data obtained with magnetic paints having a maleic acid content of 0%, the curves B and F data obtained with those having a maleic acid content of 1.0%, the curves C and G data obtained with those having a maleic acid content of 1.5%, and the curves D and H data obtained of those having a maleic acid content with 3% respectively.

Figure 2:
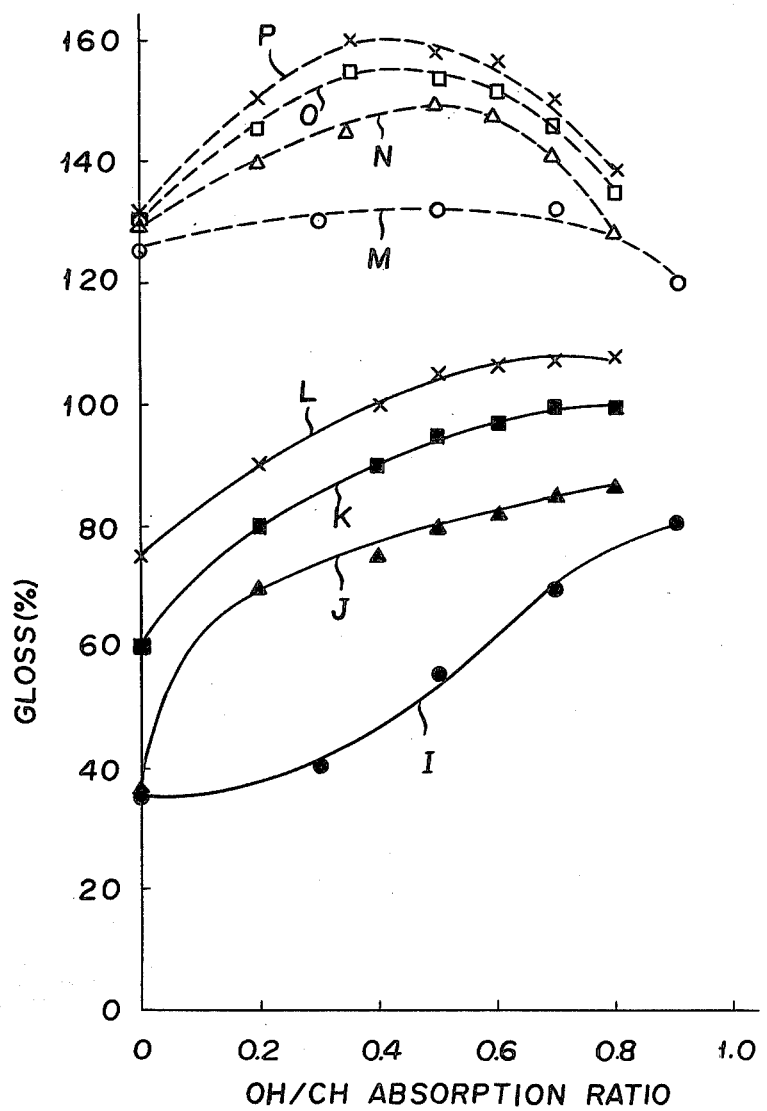

Similarly, the magnetic paints of the compositions of Control 4 and Example 6 were each applied in a layer thickness of 5 μm to the surface of a polyethylene terephthalate film (15 μm in thickness) to produce magnetic tapes. In such case, weight ratio of magnet powder/binder was 4:1, that of the copolymer/rubber binder was 6/4, myristic acid content was 1 phr, silicone oil content was 1 phr, sorbitan ester content was 3 phr, polyisocyanate content was 15 phr, and mixed solvent of methyl ethyl ketone, methyl isobutyl ketone and toluene in a weight ratio of 4:4:3 in an amount of 400 phr to the total resin and binder. The surface flatness property of the magnetic tapes immediately after the application of magnetic paints and the surface flatness property of the magnetic tapes after the treatment by the calendering process were as shown in FIG. 2. In the graphs, continuous lines based or black dots represent the degrees of gloss obtained of the magnetic tapes immediately after application of magnetic paints and dotted lines based on white dots represent the degrees of gloss obtained of the magnetic tapes after the treatment by the Calendering process. The curves I and M represent data obtained with magnetic paints having a maleic acid content of 0%, the curves J and N data obtained with those having a maleic acid content of 1.0%, the curves K and O data obtained with those having a maleic acid content of 1.5%, and the curves L and P data obtained with those having a maleic acid content of 3%.

It is clearly seen from these graphs that the gloss of the magnetic paint applied to the substrate improved in proportion as the OH/CH absorption ratio increased. Conversely, the gloss of the magnetic paint after the treatment by the calendering process declined in proportion as the OH/CH absorption ratio increased owing to some factor which has bearing upon the glass transition point. In the case of the vinyl chloride-vinyl acetate type binder containing maleic acid, the gloss immediately after application to the substrate was better than the simply saponified equivalent binder and the gloss after the treatment by the calendering process was also better when the OH/CH absorption ratio was in the range of 0.2 to 0.7. The magnetic paint of Control 3 brought about similar results to that of Example 1. Therefore, the magnetic recording medium in accordance with the present invention is very useful for a video tape.

From the magnetic paints of Control 3, Example 4, Example 5, Control 7, Example 4 and Example 10, magnetic tapes were obtained. These magnetic tapes were left standing under conditions of high temperature and high humidity, and then rated for wow flutter. Then they were run under the conditions of 60° C. and 80% RH for trouble testing. The results are shown in Table 1. It is clear from this table that magnetic tapes using blended compositions suffered degraded physical properties under the conditions of high temperature and high humidity.

TABLE 1

|  | Wow flutter under conditions of 50° C. and 80% RH | Rate of trouble in travelling under conditions of 60° C. and 80% RH |
| --- | --- | --- |
| Control 3 | 0.3–0.5% | 50–80% |
| Example 4 | 0.15% max | 10–20% |
| Example 5 | 0.10% max. | 10% max. |
| Control 7 | 0.2–0.4% | 40–70% |
| Example 4 | 0.10% max. | 10% max. |
| Example 10 | 0.15% max. | 20% max. |

Although the examples cited above embodied this invention by using $\gamma\text{-Fe}_2\text{O}_3$ and $\gamma\text{-Fe}_2\text{O}_3$ doped with cobalt as magnetic powders, this invention can be similarly applicable to other magnetic powders such as $\text{Fe}_3\text{O}_4$, $\text{Fe}_3\text{O}_4$ doped with cobalt and alloys. Various additives normally employed in magnetic recording media can be employed in this invention. Typical examples are fatty acids (myristic acid, palmitic acid, stearic acid, and behenic acid), silicone oil (dimethyl siloxane), antistatic agents (metal soap and quaternary ammonium salts) and dispersants (fatty acid esters, phosphoric esters, sorbitan esters and higher alcohols).

What is claimed is:

1. A magnetic recording medium, comprising a magnetic layer and a non-magnetic substrate therefor, which magnetic layer is formed by dispersing magnetic powder in a vehicle formed of a copolymer containing vinyl chloride, another monomer copolymerizable with vinyl chloride, a vinyl ester of an alkanoic acid and a saponification product thereof having an OH/CH absorption ratio of 0.2 to 0.7 in the infrared absorption spectrum, and a rubbery binder.

2. A magnetic recording medium according to claim 1, containing 50 to 90% by weight vinyl chloride, 5 to 1.5% by weight of another monomer copolymerizable with vinyl chloride, 40 to 5% by weight vinyl ester of alkanoic acid, balance saponification product of said vinyl ester of alkanoic acid.

3. A magnetic recording medium according to claim 1, containing 10 to 60 parts by weight rubbery binder per 100 parts by weight of total resin.

4. A magnetic recording medium according to claim 1, wherein said rubbery binder is at least one member selected from the group consisting of acrylonitrilebutadiene rubber and polyurethane.

5. A magnetic recording medium, comprising a magnetic layer and a non-magnetic substrate therefor, which magnetic layer is formed by dispersing magnetic powder in a vehicle formed of a copolymer containing vinyl chloride, another monomer copolymerizable with vinyl chloride, a vinyl ester of an alkanoic acid and a saponification product thereof having an OH/CH absorption ratio of 0.2 to 0.7 in the infrared absorption spectrum, a rubbery binder and a polyisocyanate.

6. A magnetic recording medium according to claim 5, containing 10 to 60 parts by weight rubbery binder per 100 parts by weight of total resin excluding polyisocyanate.

7. A magnetic recording medium according to claim 5, containing 5 to 30% by weight polyisocyanate based on the solids content of said vehicle.

8. A magnetic recording medium according to claim 5, wherein said rubbery binder is at least one member selected from the group consisting of acrylonitrilebutadiene rubber and polyurethane.

9. A magnetic recording medium according to claim 6, containing 50 to 90% by weight vinyl chloride, 5 to 1.5% by weight of another monomer copolymerizable with vinyl chloride, 40 to 5% by weight vinyl ester of alkanoic acid, balance saponification product of said vinyl ester of alkanoic acid.

10. A magnetic recording medium according to claim 6, containing 10 to 25% by weight polyisocyanate based on the solids content of said vehicle.

* * * * *